US012675664B2

(12) United States Patent  (10) Patent No.: US 12,675,664 B2

Ghilardi  (45) Date of Patent: Jul. 7, 2026

(54) METHOD FOR CHECKING AND TRACKING A CONSTRUCTION PRODUCT

(71) Applicant: ISG GHILARDI S.R.L., Bergamo (IT)

(72) Inventor: Cristian Ghilardi, Bergamo (IT)

(73) Assignee: ISG GHILARDI S.R.L., Bergamo (IT)

( * ) Notice: Subject to any disclaimer, the term of this patent is extended or adjusted under 35 U.S.C. 154(b) by 323 days.

(21) Appl. No.: 18/696,419

(22) PCT Filed: Sep. 23, 2022

(86) PCT No.: PCT/IB2022/059034
§ 371 (c)(1),
(2) Date: Mar. 28, 2024

(87) PCT Pub. No.: WO2023/052920
PCT Pub. Date: Apr. 6, 2023

(65) Prior Publication Data
US 2024/0386234 A1     Nov. 21, 2024

(30) Foreign Application Priority Data

Sep. 28, 2021   (IT) ........................ 102021000024782

(51) Int. Cl.
G06K 19/077 (2006.01)
G06Q 50/08 (2012.01)
H04W 4/029 (2018.01)
(52) U.S. Cl.
CPC ....... G06K 19/07758 (2013.01); G06Q 50/08 (2013.01); H04W 4/029 (2018.02)

(58) Field of Classification Search
CPC . G06K 19/07758; G06Q 50/08; H04W 4/029; E04C 2/526
See application file for complete search history.

(56) References Cited

U.S. PATENT DOCUMENTS

| | | | | |
|---|---|---|---|---|
| 2010/0026457 A1* | 2/2010 | Holloway | ................. | G01S 1/68 |
| | | | | 340/10.1 |
| 2010/0253497 A1* | 10/2010 | Bakker | ................. | F16D 66/026 |
| | | | | 340/454 |
| 2011/0180607 A1* | 7/2011 | Kennedy | ................ | G06Q 10/00 |
| | | | | 235/488 |

(Continued)

FOREIGN PATENT DOCUMENTS

JP          2017202690 A     11/2017

*Primary Examiner* — Ziaul Karim

(74) *Attorney, Agent, or Firm* — Dickinson Wright PLLC; Andrew D. Dorisio

(57) ABSTRACT

A method for checking and tracking a construction product involves arranging a microchip configured to exchange information with a remote-control device; associating predefined information about the construction product to the microchip; irremovably applying the microchip on the construction product; carrying out the check and tracking of the construction product through a predefined communication mode between the microchip and the remote-control device; carrying out a communication between each remote-control device and at least one management server configured to communicate with each remote-control device for checking all the predefined information contained on different microchips and concerning a plurality of construction products different from each other.

9 Claims, 17 Drawing Sheets

(56) References Cited

U.S. PATENT DOCUMENTS

| 2018/0089546 A1* | 3/2018 | Jones | ...................... E04C 2/043 |
| 2018/0089549 A1 | 3/2018 | Wu | |
| 2019/0045478 A1* | 2/2019 | Runyon | ................ H04W 4/029 |
| 2019/0122174 A1* | 4/2019 | Gil | ..................... G06Q 10/0833 |
| 2021/0356279 A1* | 11/2021 | Szigeti | ............... G01C 21/3407 |

* cited by examiner

28

30                                    26

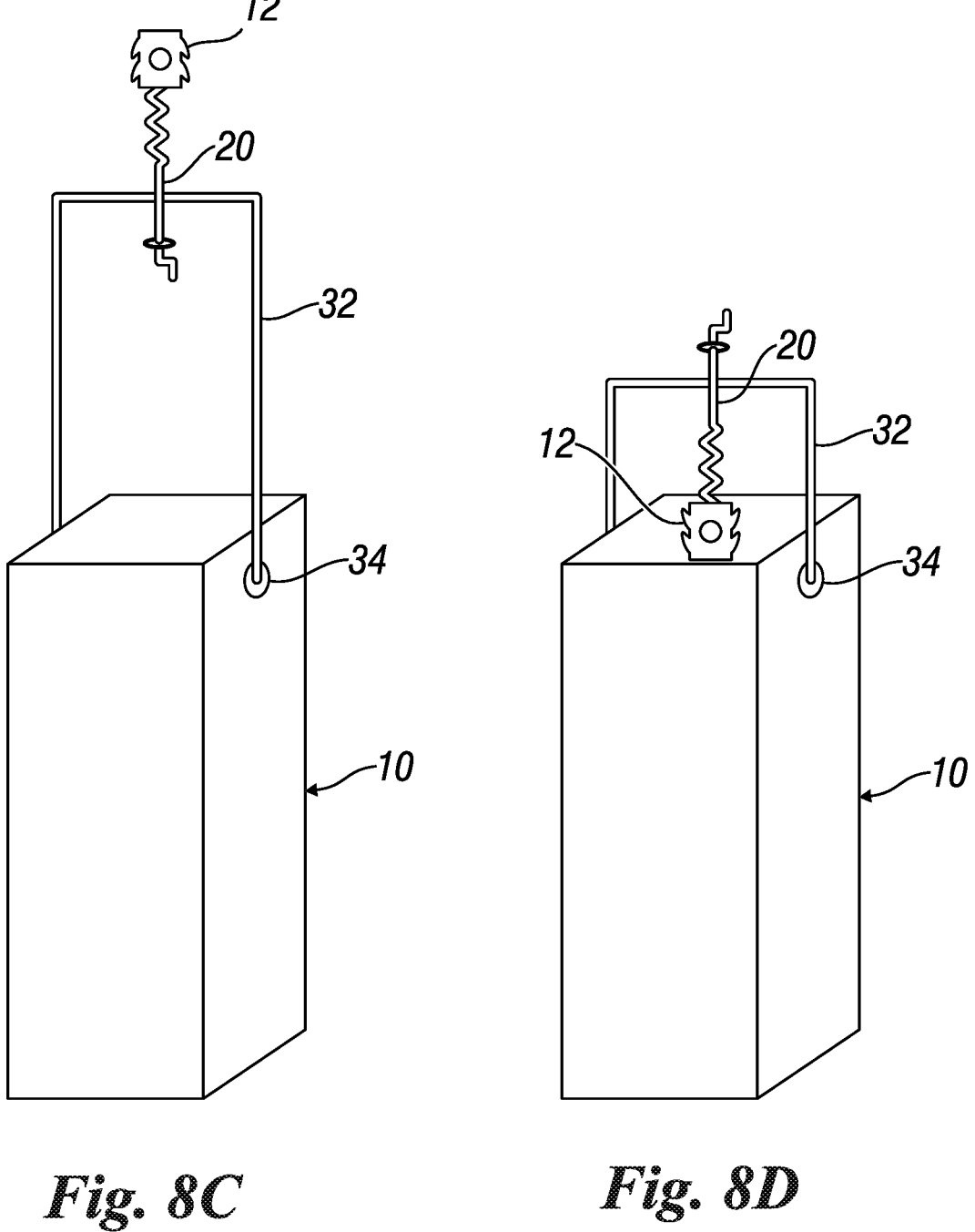
Fig. 8C             Fig. 8D

20

20

20

1

METHOD FOR CHECKING AND TRACKING A CONSTRUCTION PRODUCT

TECHNICAL FIELD

The present invention generally relates to a construction product and, in particular, to a method for checking and tracking a construction product, preferably but not exclusively consisting of an insulating panel, a window and/or door frame or a scaffolding.

BACKGROUND

As is known, the current European regulations on construction products aim to guarantee not only the quality of construction products, but also the traceability of the construction products themselves. For example, the EU regulation No. 305/2011, also called European Construction Products Regulation (CPR), provides that one of the various obligations to be complied with by the manufacturers of construction products is also to ensure the identification and complete traceability of certain construction products, at least up to the moment when these construction products are used on the construction site. Another legislation in force in Italy, namely the so-called "Minimum Environmental Criteria" or MEC, establishes specific environmental and ecological requirements for public procurement, aiming at meeting the public administration's need to streamline its consumption and reduce its expenditure and identifying the best product, service, or design solution in environmental terms.

Currently, a method for checking and tracking construction products includes the application of an identification label on the construction products and/or on the respective packaging (when applicable), containing predefined information about the specific construction product. A drawback of that checking and tracking method is that the label can be more or less easily tampered with and/or removed from the respective construction product, therefore compromising its identification and subsequent traceability.

Another method for checking and tracking construction products includes the application of a QR code on the construction products and/or on the respective packaging (when applicable), that can contain the same predefined information about the specific construction product which can be found on the aforementioned identification label. However, the reading of this information is not immediate, but requires the use of a special optical reading device. Even the QR code, however, can be fraudulently removed from the respective construction product, thus compromising its identification and subsequent traceability.

In addition, it is sometimes a bad habit to open the packages during the transport of construction products in order to load only a part of the construction products as bulk goods. Also in this case, therefore, if the identification label or QR code were applied to the packaging rather than directly on the construction products, the possibility of identifying and tracking the construction products in the phases following the transport phase would be lost.

Document US 2018/0089546 A1 discloses a construction product, in particular a plasterboard panel, which is provided with at least one wireless or magnetically readable identifier. The purpose of the identifier, however, is exclusively to determine a specific type of plasterboard panel (or other building product) after installation and/or decoration of the wall and/or ceiling on which this panel has been installed, without damaging the plasterboard or any decoration applied to it.

Document JP 2017-202690 A discloses a method of manufacturing a concrete structure embedded with at least one microchip. The purpose of the microchip, however, is exclusively to identify the manufacturing information of the concrete structure, as well as the characteristic values of the concrete structure itself.

Document US 2011/180607 A1 shows how to embed a control microchip on a pallet. Finally, document US 2010/253497 A1 discloses a braking device for motor vehicles provided with a control microchip.

The object of the present invention is therefore to provide a method for checking and tracking a construction product which is capable of solving the aforementioned drawbacks of the prior art in an extremely simple, economical and particularly functional way.

In detail, it is an object of the present invention to provide a method for checking and tracking a construction product that is capable of ensuring the traceability and quality of the construction product without the danger of tampering, alteration and/or replacements throughout the life cycle of the construction product.

Another object of the present invention is to provide a method for checking and tracking a construction product that is capable of ensuring the traceability of the construction product not only up to its use on the construction site, but also possibly after the construction product has been assembled on site, including the disposal step, with a view to managing the complete life cycle of the product, so as to provide greater safety for the end consumer.

Another object of the present invention is to provide a method for checking and tracking a construction product that is capable of ensuring the traceability and immutability of the information relating to the carbon footprint generated during manufacture of the construction product.

Another object of the present invention is to provide a method for checking and tracking a construction product that guarantees immediate and safe verification of full compliance with the regulations in force by the construction product, for example to obtain tax relief and/or financial concessions from credit institutions, as well as to avoid fraud.

Another object of the present invention is to provide a method for checking and tracking a construction product that allows to verify at any time the presence of the correct materials during the construction of the building.

Another object of the present invention is to provide a method for checking and tracking a construction product which allows easy retrieval of the construction product in the event of any theft.

Another object of the present invention is to provide a method for checking and tracking a construction product that avoids the "recycling" of the construction product, intended as a use other than that which was initially envisaged for the construction product.

SUMMARY

Still another object of the present invention is to provide a method for checking and tracking a construction product which can discourage the counterfeiting of the construction product.

These and other objects according to the present invention will be achieved by providing a method for checking and tracking a construction product as set forth in claim 1.

Further features of the invention are highlighted by the dependent claims, which are an integral part of this description.

BRIEF DESCRIPTION OF THE DRAWINGS

The features and advantages of a method for checking and tracking a construction product according to the present invention will be clearer from the following exemplifying and hence non-limiting description, referring to the attached schematic drawings wherein:

FIGS. 8A-8D respectively show the various operating steps of the device of FIGS. 7A and 7B;

DETAILED DESCRIPTION

Figure 1:
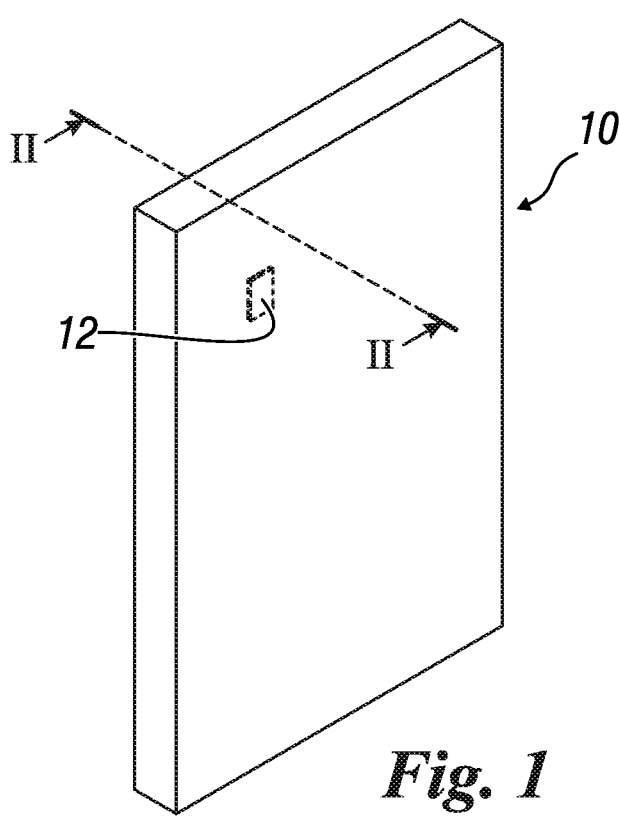
FIG. 1 is a perspective view of a first embodiment of a construction product provided with a respective checking and tracking system capable of implementing the method according to the present invention, wherein the construction product consists in particular of an insulating panel.
Figure 2:
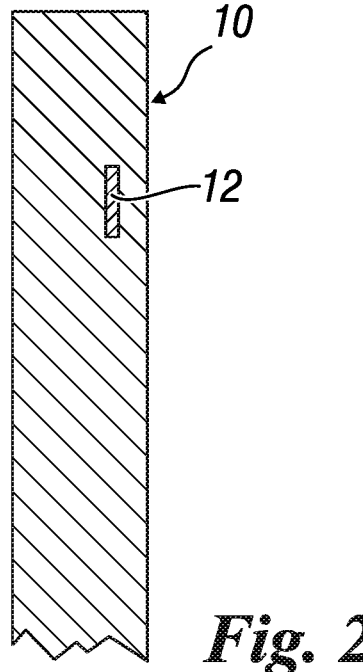
FIG. 2 is a sectional view, obtained along the line II-II of FIG. 1, of the construction product shown in FIG. 1.

With reference in particular to FIG. 1, a preferred embodiment of a construction product provided with a respective checking and tracking system capable of implementing the method according to the present invention is shown. The construction product is indicated as a whole with the reference number 10. In the embodiment shown in the figures, the construction product 10 consists in particular of an insulating panel, but it could also consist of other similar articles, as well as of further architectural and/or functional elements such as window and/or door frames, beams, tiles, monoblock hydraulic equipment, boilers, solar thermal panels, etc.

If the construction product 10 consists of an insulating panel, the latter can be manufactured with any suitable material, such as cork, wood fiber, rock fiber, sintered expanded polystyrene (EPS) with or without graphite additive, polyurethane rigid foam (PIR). That material can have both construction and shipbuilding applications.

Each construction product 10 is then provided, individually or in groups composed of two or more similar construction products 10, with a respective package (not shown). In other words, one or more construction products 10 can be at least partially covered and/or enclosed by a respective package which allows them to be transported and stored before installation.

On the surface, or in any other position, of each construction product 10, or on at least part of the construction products 10 enclosed by the same package, or on a single package which covers and/or at least partially encloses one or more construction products 10, at least one microchip 12 containing predefined information about the specific construction product 10 is irremovably applied. 10. In particular, this predefined information can contain:

the information about the construction product 10 composition;

the construction product 10 order number;

the information about the manufacturer of the construction product 10;

the information about the construction product 10 production batch;

the information about any certifications of the construction product 10;

the information about the construction product 10 transportation modes and its geolocation;

the information about the construction product 10 transportation modes;

the information about the recipient of the construction product 10;

the information about the installation and any disassembly of the construction product 10;

the information about the disposal methods provided for the construction product 10;

the information necessary to ensure correct and efficient management of the life cycle of the construction product 10;

the information relating to the carbon footprint of the construction product 10.

Figure 12:
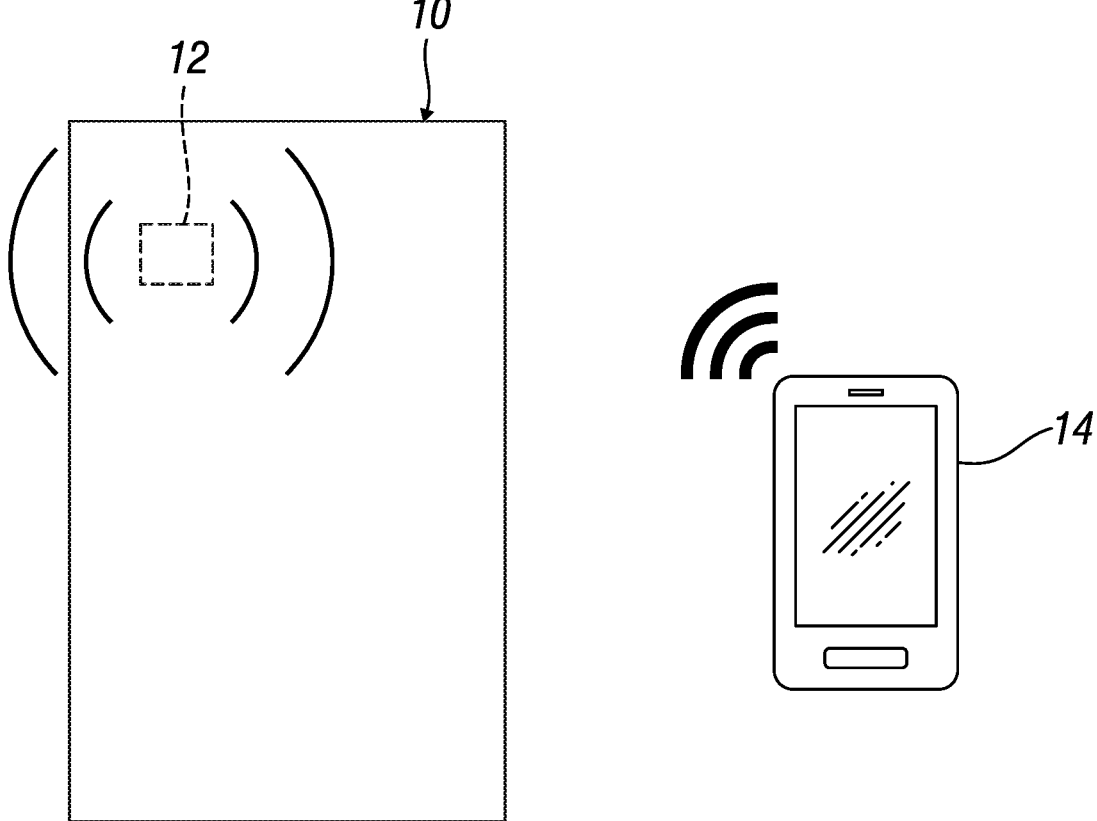
FIG. 12 shows one of the components of a system which implements the checking and tracking method of the present invention.

Each microchip 12 can be also internally provided with at least one communication device which, through a proprietary wireless communication protocol, is configured to send the predefined information contained in the microchip 12 to one or more remote-control devices 14 (FIG. 12). For example, the wireless communication protocol can be of the radio frequency type with LF, HF, UHF and VHF frequencies.

Each remote-control device 14 can be of the mobile type, such as a PC, a tablet or a Smartphone on which a suitable control software is installed. Alternatively, when the construction product 10 is on the construction site, the remote-control device 14 can also be of the fixed type, such as one or more RFID antennas. These RFID antennas are designed to exchange data with a control unit, which in turn sends the data to a server. The RFID antenna system is used on the construction site to be able to check at any time that the correct products and/or materials are always installed and that these products and/or materials, after being installed, are always present in the building while it is being built, so as to avoid theft or construction errors.

In addition, each microchip 12 can also be internally provided with a GPS transceiver, which is configured to receive information on the geographic coordinates of the respective construction product 10 and to transmit this information to said remote-control device 14. In this way, the geo-localization of each construction product 10 and/or the respective package, provided with the corresponding microchip 12, can be guaranteed.

As an alternative to the above embodiments, which provide that the microchip 12 is of the "active" type, each microchip 12 could also consist of a passive RFID device, such as a label. This passive RFID device receives, when passing a remote-control device consisting in this case of a reading device (RFID antenna) that emits a specific radio signal at a predefined frequency, the energy needed to communicate with the reading device, retransmitting it a signal containing the information contained in the microchip 12.

Figure 13:
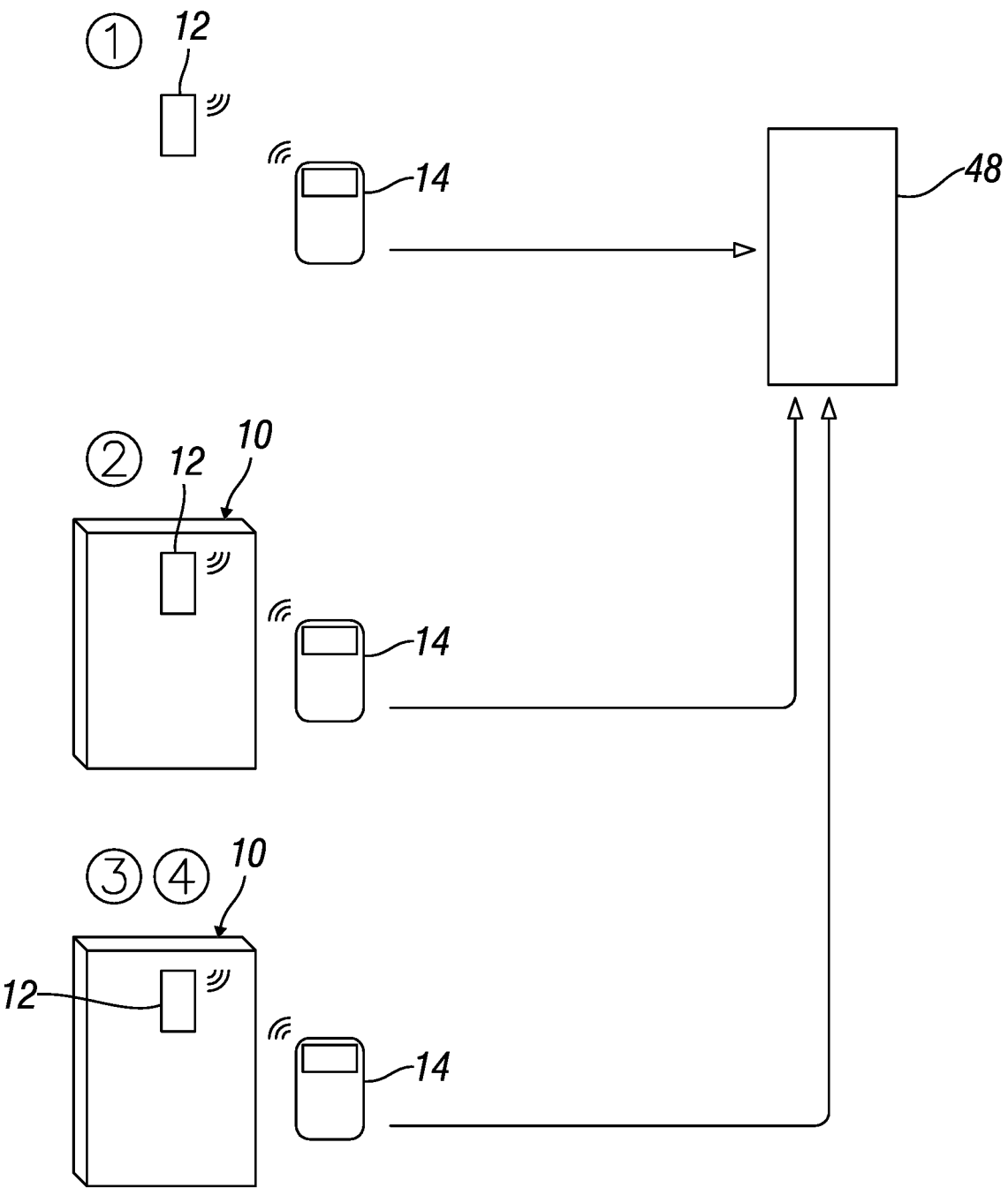
FIG. 13 is a block diagram illustrating the operating steps of the checking and tracking method of the present invention.

In addition to the information contained in the microchip 12, if this microchip 12 is of the "active" type, the remote-control device 14 can be equipped with a specific checking and tracking software which, with reference to FIG. 13, allows following steps of checking and tracking to be implemented. In a first step, the predefined information about a specific construction product 10 is associated with each microchip 12 through the remote-control device 14. Subsequently, the microchip 12 is irremovably applied, through at least one installation device 20 such as those that will be described below, on the surface, or on any other position, of a specific construction product 10, or on at least part of the specific construction products 10 enclosed by the same package, or on a single package that at least partially covers and/or encloses one or more specific construction products 10. Once the microchip 12 is correctly applied, it is possible to check and track the specific construction product 10, or at least part of specific construction products 10 enclosed in the same package, or of a single package that covers and/or encloses at least partially one or more specific construction products 10 through a predefined communication mode between the microchip 12 and the remote-control device 14.

For example, the step of carrying out the check and tracking can comprise one or more of the following substeps:

management control of said construction product 10;

management control of the shipment of said construction product 10;

management control of the delivery of said construction product 10 to the purchaser (such as the construction company in charge of the installation);

control of the presence of the construction product 10 during all the construction steps of a specific building;

checking the construction product 10 at the end customer, during and after the installation of that construction product 10.

At least one management server 48 can be provided, configured to communicate with each remote-control device 14 for checking all the predefined information contained on different microchips 12 and concerning a plurality of specific construction products 10 different from each other.

Purely by way of example, each microchip 12 can have a plan shape which is substantially rectangular, with dimensions of about 90 mm in width and about 25 mm in length. However, other shapes and/or dimensions are not excluded depending on the technical requirements and the type of construction product 10. Again preferably, each microchip 12 can be at least partially coated with a plasticized protective film.

Figure 3A:
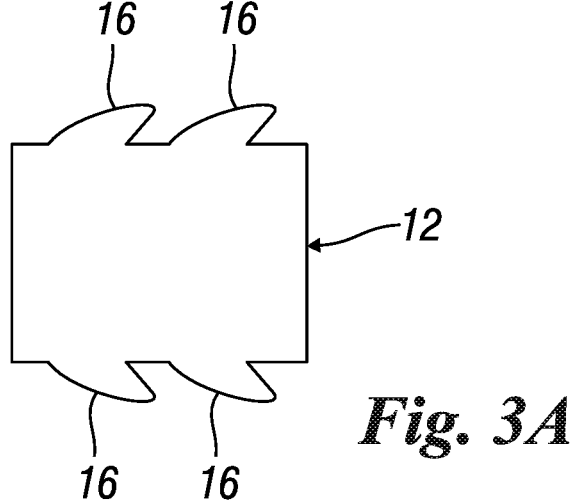
FIGS. 3A and 3B show two possible embodiments of a microchip applicable to a construction product and/or to a respective package according to the checking and tracking method of the present invention.
Figure 3B:
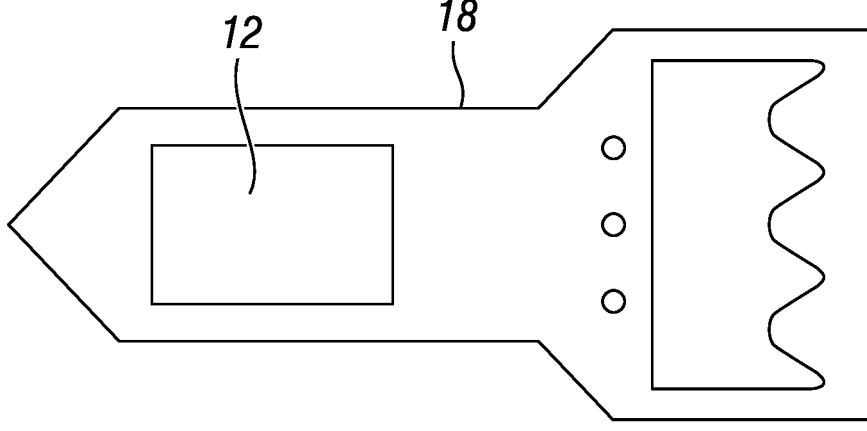

For its irremovable mounting on the respective construction product 10 and/or on the relative packaging, each microchip 12 can be manufactured with particular shapes and/or with high-strength materials, such as of hardened carbon steel. For example, FIG. 3A shows a possible embodiment of the microchip 12, which is inserted in a casing provided with a plurality of shaped teeth 16 or prongs arranged to engage in the material with which the construction product 10 is made. Thanks to the presence of shaped teeth 16 or prongs, such as those normally provided on fishing hooks, the casing of the microchip 12 assumes a "fishbone" shape which guarantees an effective anchorage in the material with which the construction product is manufactured 10. The shaped teeth 16 or prongs can be obtained on the casing of the microchip 12 by means of a die-cutting operation of the casing. FIG. 3B instead shows a further embodiment of the microchip 12, which is fixed on at least one shaped support 18 arranged for irremovably mounting on the respective construction product 10 and/or on the relative package.

Figure 4A:
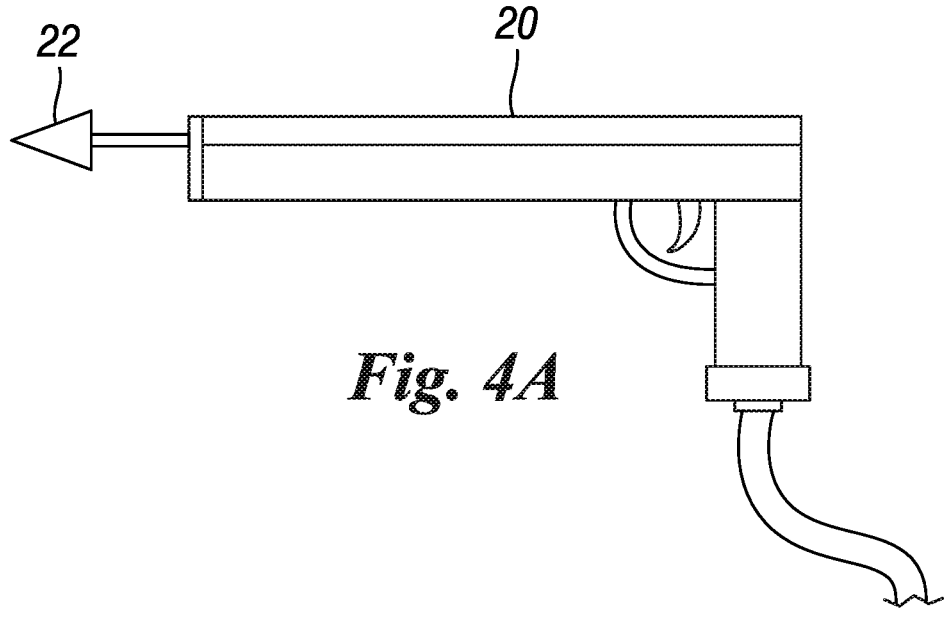
FIGS. 4A and 4B respectively show two distinct operating steps of a first embodiment of a device for installing a microchip on a construction product such as the one in FIG. 1.
Figure 4B:
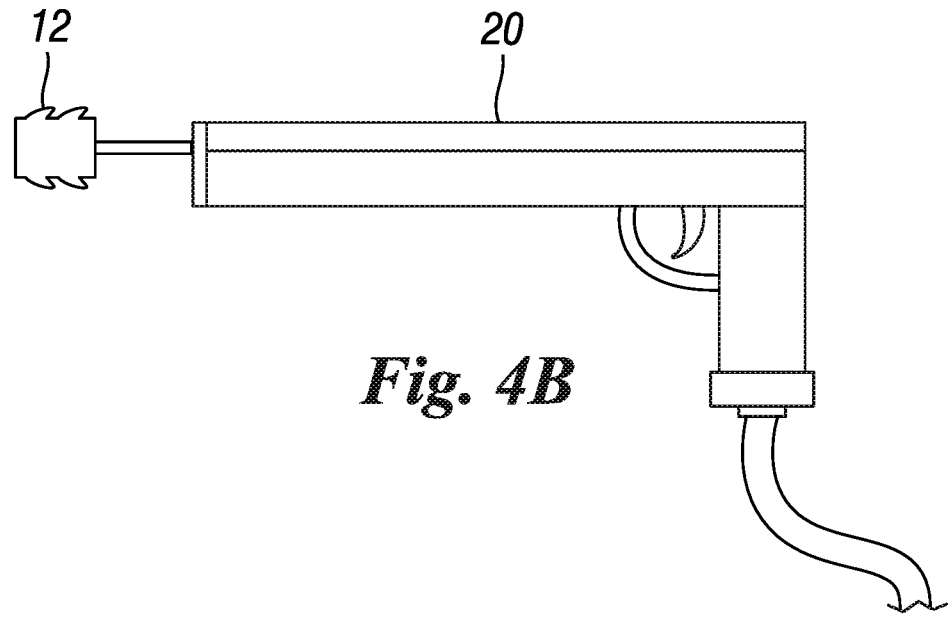

Regardless of the type of microchip 12, this microchip 12 can be irremovably applied to the construction product 10 and/or to the respective package by means of a plurality of possible installation devices 20. FIGS. 4A and 4B show a first embodiment of this installation device 20, substantially consisting of a compressed air hammer gun. In a first operating step, shown in FIG. 4A, the hammer gun 20 is provided with a drilling tool 22, such as a heated drill tip designed to make a hole in a construction product 10 made with a heat-sensitive material. The tip 22 can have any suitable shape, such as circular, rectangular, square, rhombus, parallelepiped shape, etc. In a second operating step, shown in FIG. 4B, the hammer gun 20 directly engages the microchip 12 in the hole made with the aforementioned drilling tool 22.

Figure 5:
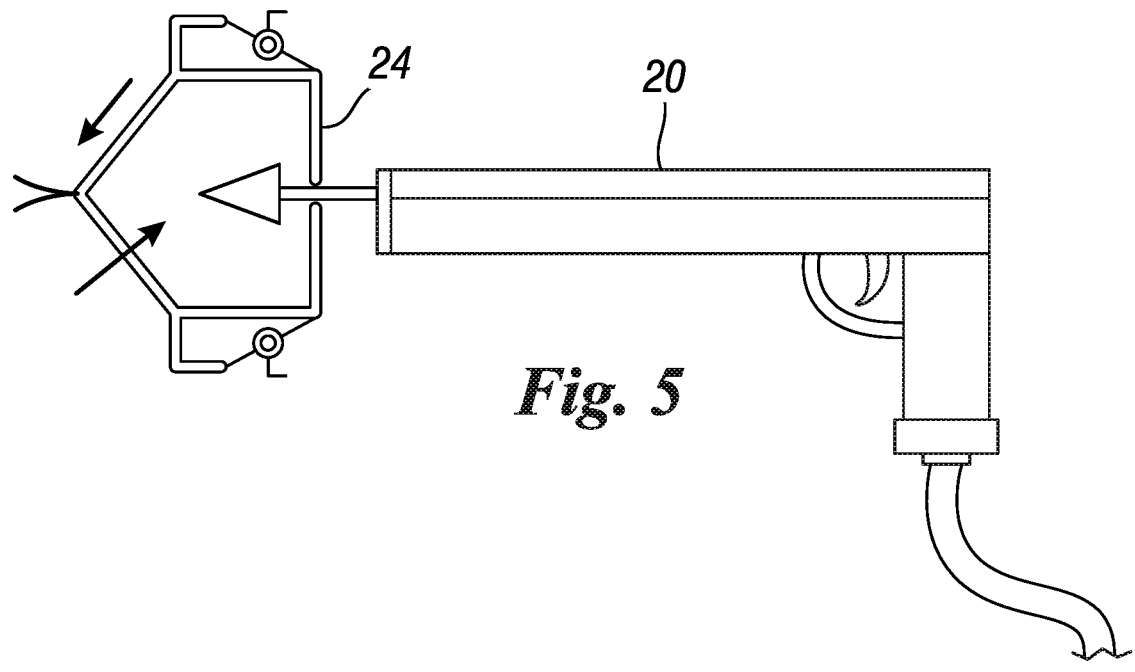
FIG. 5 shows a second embodiment of a device for installing a microchip on a construction product such as the one in FIG. 1.

FIG. 5 shows a second embodiment of the installation device 20, again consisting of a compressed air hammer gun but provided with a multifunctional drilling and installation tool 24. This multifunction tool 24 can in fact be provided with both the drilling tip of the type described above, and a support element for the microchip 12, and also with an adjustable clamp which allows the installation of this microchip 12. The operating steps of this second embodiment of the installation device 20 are therefore as follows. The drill tip makes a hole in the construction product 10. Then the microchip 12 is positioned in its support element, which is contained within the clamp. Subsequently, a slot is opened in the clamp which is provided with adjustable tie rods to determine the width of the opening. Finally, the microchip 12 is inserted into the hole made in the construction product 10, by pulling out this microchip 12 (which is preferably of the prong type) of the slot in the clamp.

Figure 6A:
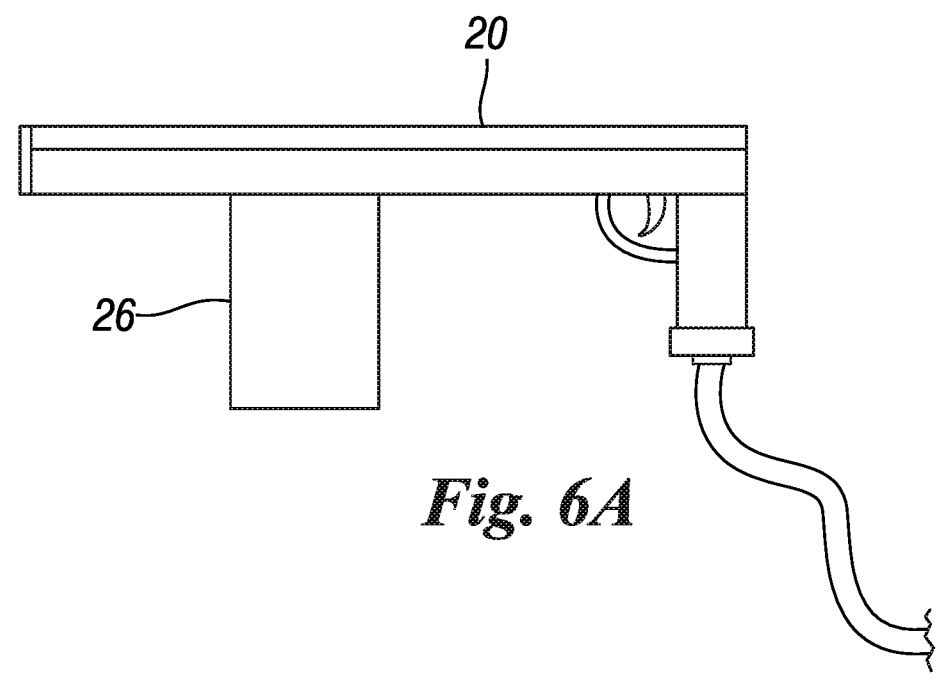
FIGS. 6A-6C respectively show a third embodiment of a device for installing a microchip on a construction product such as the one in FIG. 1, as well as special tools for drilling and installing the microchip.
Figure 6B:
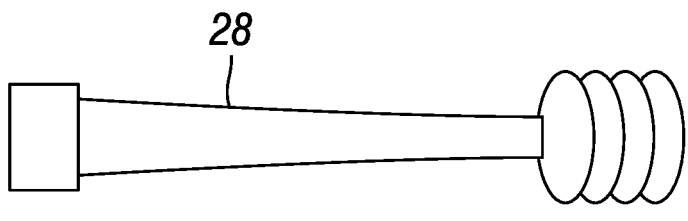
Figure 6C:
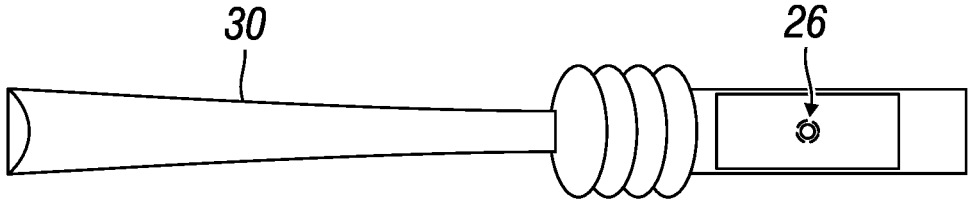

FIGS. 6A-6C respectively show a third embodiment of the installation device 20 and the respective tools for drilling and installing the microchip 12. Again the installation device 20 consists of a compressed air hammer gun, with a suitable container 26 for storing a plurality of microchips 12. At least one drilling tool 28 of the hammer type (FIG. 6B) and at least one installation tool 30 (FIG. 6C) which picks up each microchip 12 from the suitable container 26 are therefore provided.

Figure 7A:
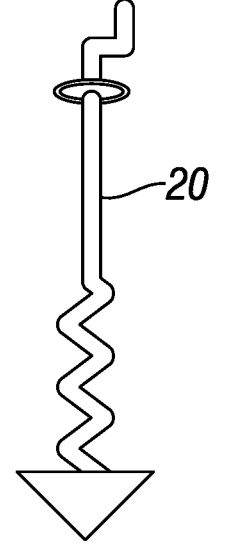
FIGS. 7A and 7B respectively show a fourth embodiment of a device for installing a microchip on a construction product such as the one in FIG. 1.
Figure 7B:
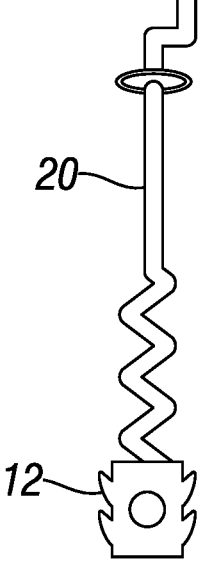

FIGS. 7A and 7B respectively show a fourth embodiment of the installation device 20. The installation device 20 consists in this case of a crank auger which can be equipped with an interchangeable tip. FIG. 7A shows the drill tip. In FIG. 7B the tip consists of a microchip 12 punched in a prong shape. During the drilling step (FIGS. 8A and 8B), the drill tip operates in the usual hot mode. During the installation step (FIGS. 8C and 8D), the microchip 12 is inserted into the hole previously formed by the drill tip.

Figure 8A:
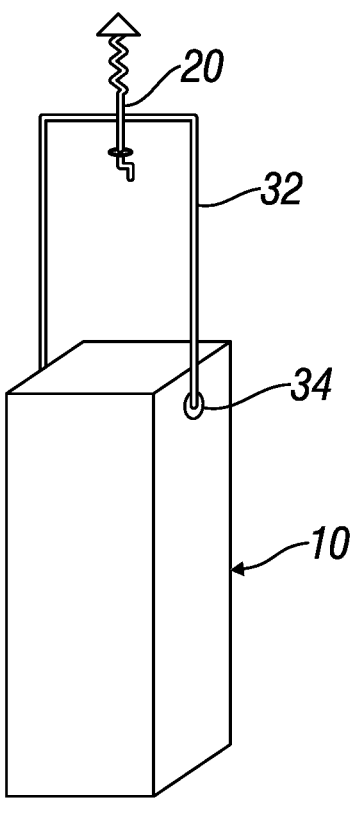
Figure 8B:
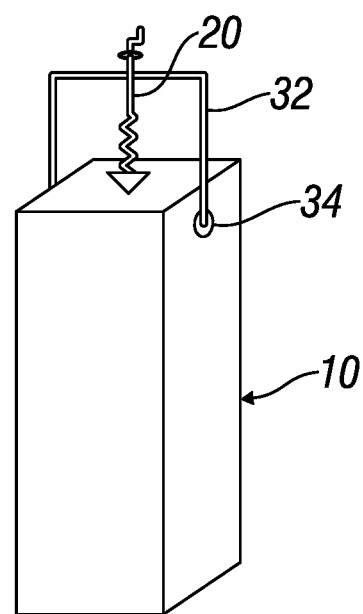

To ensure stability and fast replacement of the interchangeable tip, the installation device 20 can be mounted on a telescopic support structure 32, that is to say provided with extendable rods. The telescopic support structure 32 can be reversibly fixed on the construction product 10 (for example on its sides when this construction product 10 consists of a parallelepiped-shaped panel) by means of pressure suckers 34 (for example of the type commonly used to lift glass plates). FIGS. 8A and 8C show the telescopic support structure 32 in an inoperative configuration, that is to say with the installation device 20 placed at a distance from the construction product 10 for replacing the interchangeable tip. FIGS. 8B and 8D show, instead, the telescopic support structure 32 in an operative configuration, that is to say with the installation device 20 placed near the construction product 10 to allow the interchangeable tip to operate.

Figure 9A:
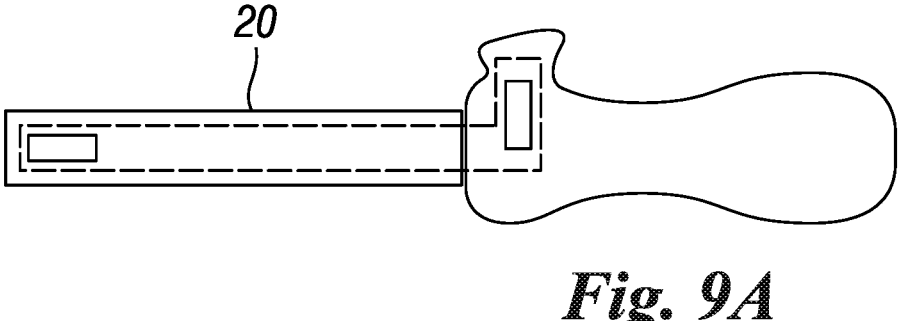
FIGS. 9A-9C respectively show other possible embodiments of the device for installing a microchip on a construction product such as the one in FIG. 1.
Figure 9B:
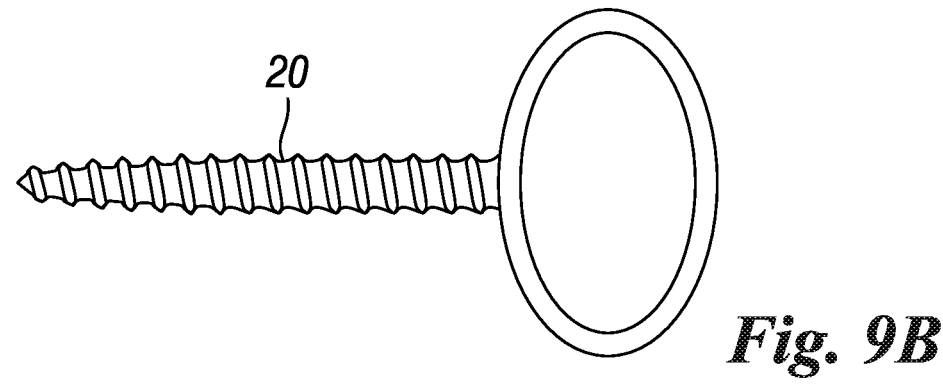
Figure 9C:
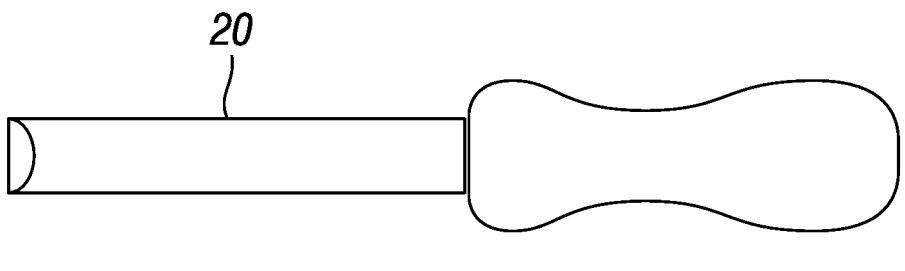

FIGS. 9A-9C respectively show other possible embodiments of the microchip 12 installation device 20. These further installation devices 20 can be provided with the respective tools for drilling and/or installing the microchip 12.

Figure 9D:
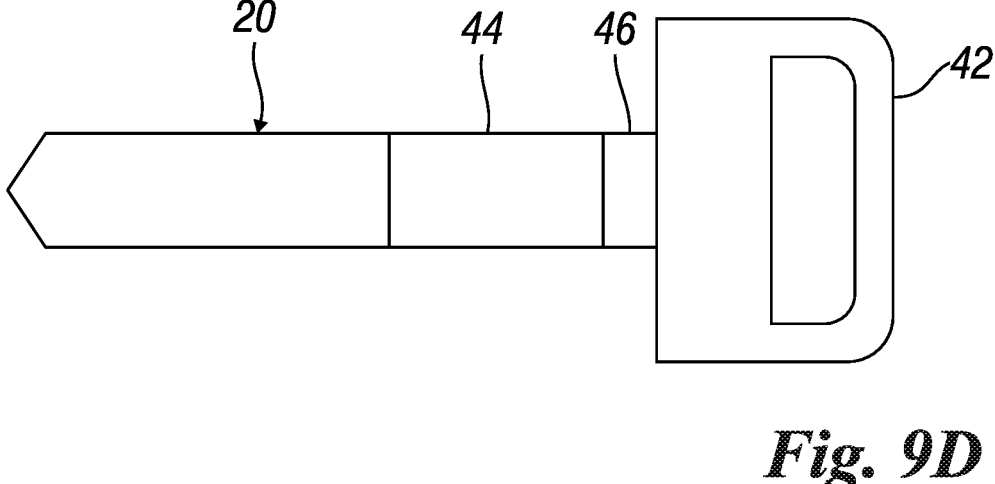
FIGS. 9D-9E show in top view and side view, respectively, a further embodiment of the device for installing a microchip on a construction product such as the one in FIG. 1.
Figure 9E:
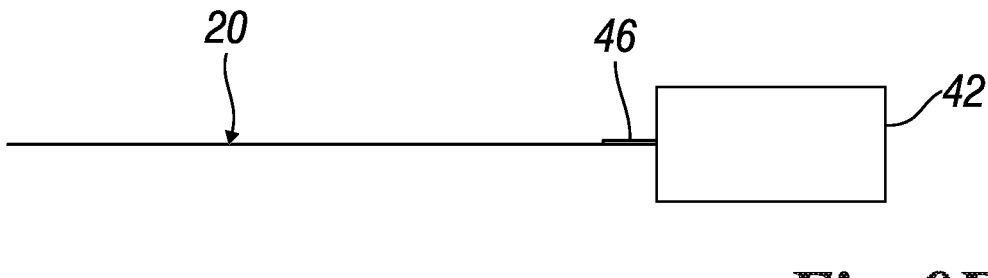

FIGS. 9D-9E show in top view and side view, respectively, a further embodiment of the microchip 12 installation device 20. This installation device is made in the form of a thin and sharp blade (very similar in shape to a common utility knife). The blade is provided with a handle 42 (at one of its ends) and a shaped seat 44 for housing the microchip 12. This microchip 12 can be, for example, of the prong die-cut type described above and shown in FIG. 3A. A support step or projection 46, which has a stop and/or brake function for the microchip 12, can then be provided between the handle 42 and the shaped seat 44. This support step or projection 46 therefore has the function of ensuring stability to the microchip 12 and reducing to a minimum the possibility that the microchip 12 moves and possibly falls from the installation device 20 in the insertion step into the construction product 10.

Figure 10A:
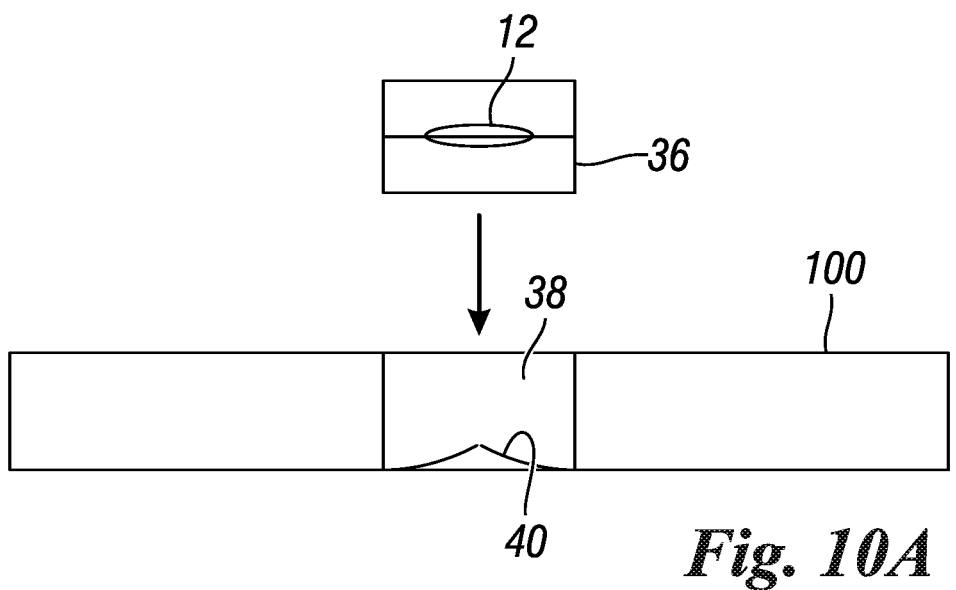
FIG. 10A is a schematic view of a second embodiment of a construction product provided with a respective checking and tracking system capable of implementing the method according to the present invention, wherein the construction product consists in particular of a window and/or door frame.

FIG. 10A shows a construction product 100 consisting in particular of a frame, such as for example a door or a window frame. The microchip 12 is housed inside a plug 36 which can be inserted into a corresponding seat 38 obtained in the frame 100. The seat 38 can be obtained during the manufacturing step of the frame 100. The cap can be inserted in the corresponding seat 38 by means of tongue and groove edges.

Figure 10B:
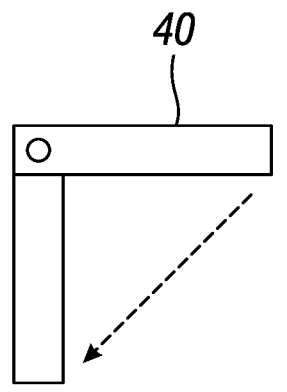
FIG. 10B is a detail view of a detail of FIG. 10A.

Inside the seat 38 one or more mechanical sensors 40 can be provided, such as sensory springs or tongues operating by compression (FIG. 10B). These mechanical sensors are configured to activate an alarm in case of tampering with the cap 36 and the relative microchip 12. The cap 36 can be magnetized for its greater stability inside the seat 38 obtained in the frame 100 (which in this case must be manufactured with a ferromagnetic material). As shown in FIG. 10, the cap 36 can consist of two separate parts which, when joined, form an internal seat within which the microchip 12 can be inserted and enclosed.

Figure 10C:
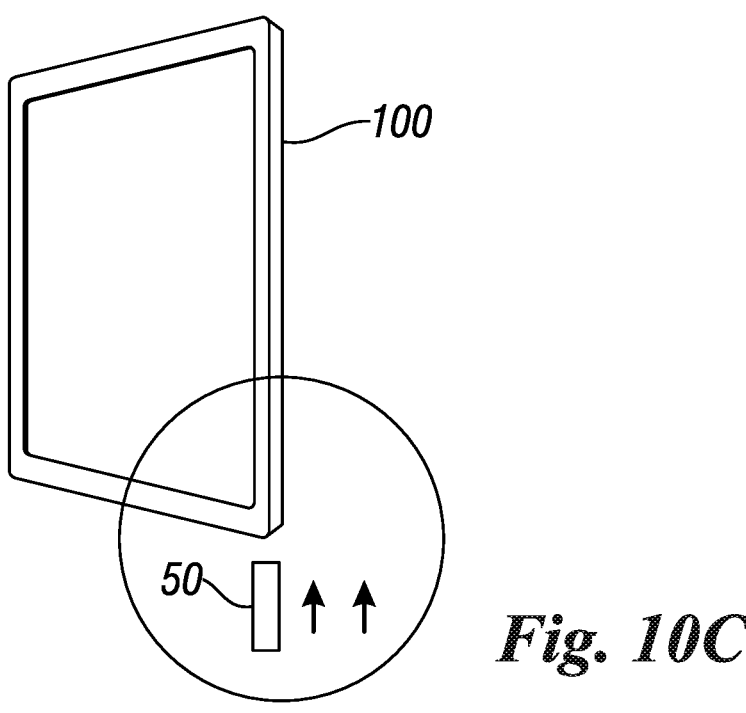
FIG. 10C is a schematic view of a third embodiment of a construction product provided with a respective checking and tracking system capable of implementing the method according to the present invention, wherein the construction product once again consists of a window and/or door frame.
Figure 10D:
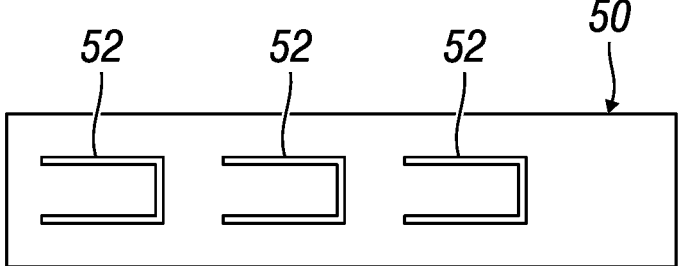
FIG. 10D is a side view of a microchip storage element shown in FIG. 10C.
Figure 10E:
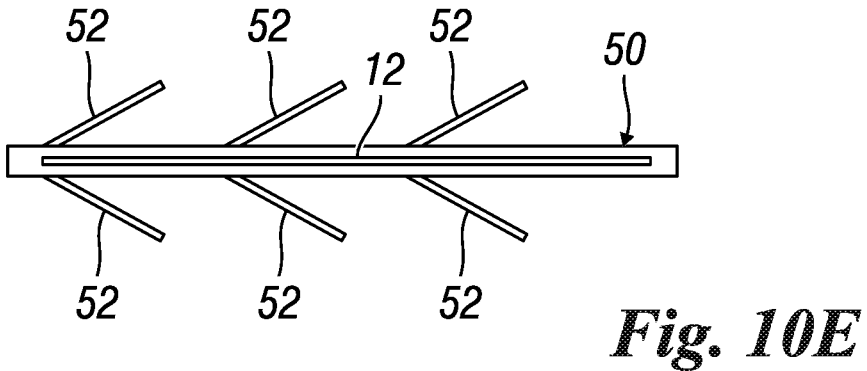
FIG. 10E is a sectional view of the storage element of FIG. 10D.

FIG. 10C shows a construction product 100 which once again consists of a frame, such as a door or a window frame. The microchip 12 is housed inside a storage element 50 in the shape of an internally hollow case. As shown in FIGS. 10D and 10E, this storage element 50 is externally provided with one or more flexible fins 52. The storage element 50, already provided internally with a respective microchip 12 (FIG. 10E), is designed to be inserted in a corresponding seat provided, for example, at an external corner of the frame 100, as shown in FIG. 10C. Obviously, in the production step of the frame 100, the manufacturing of the aforementioned seat must be envisaged. The flexible fins 52, which are suitably angled with respect to the external surfaces of the storage element 50 (as shown in FIG. 10E), flex to allow easy insertion of the storage element 50 in the seat provided in the frame 100. On the other hand, by fitting inside the seat provided in the frame 100, these flexible fins 52 will prevent a subsequent removal of the storage element 50, as well as of the microchip 12 stored therein.

Figure 11:
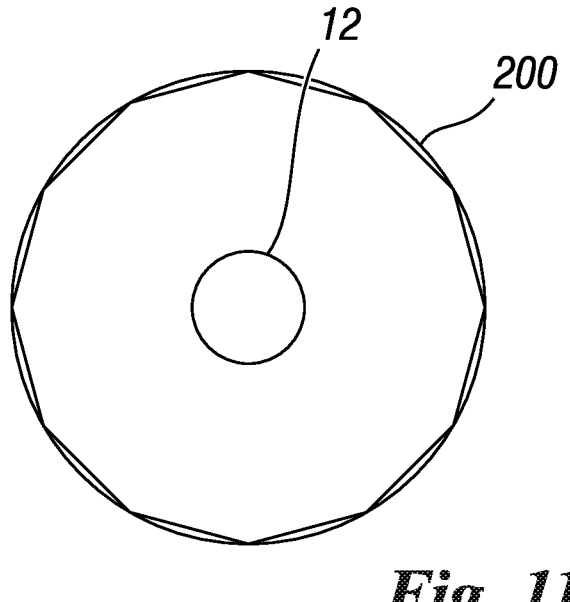
FIG. 11 is a schematic view of a fourth embodiment of a construction product provided with a respective checking and tracking system capable of implementing the method according to the present invention, wherein the construction product consists in particular of a boiler.

FIG. 11 shows a construction product 200 consisting in particular of a hydraulic equipment, such as a boiler or a solar thermal panel. The microchip 12 can be inserted inside the hydraulic equipment 200 by means of a magnetized casing. To avoid tampering, the casing can be provided with a special safety toothing (not shown) which retracts, allowing it to be opened, only after entering a secret code generated by the remote-control device 14.

Figure 14A:
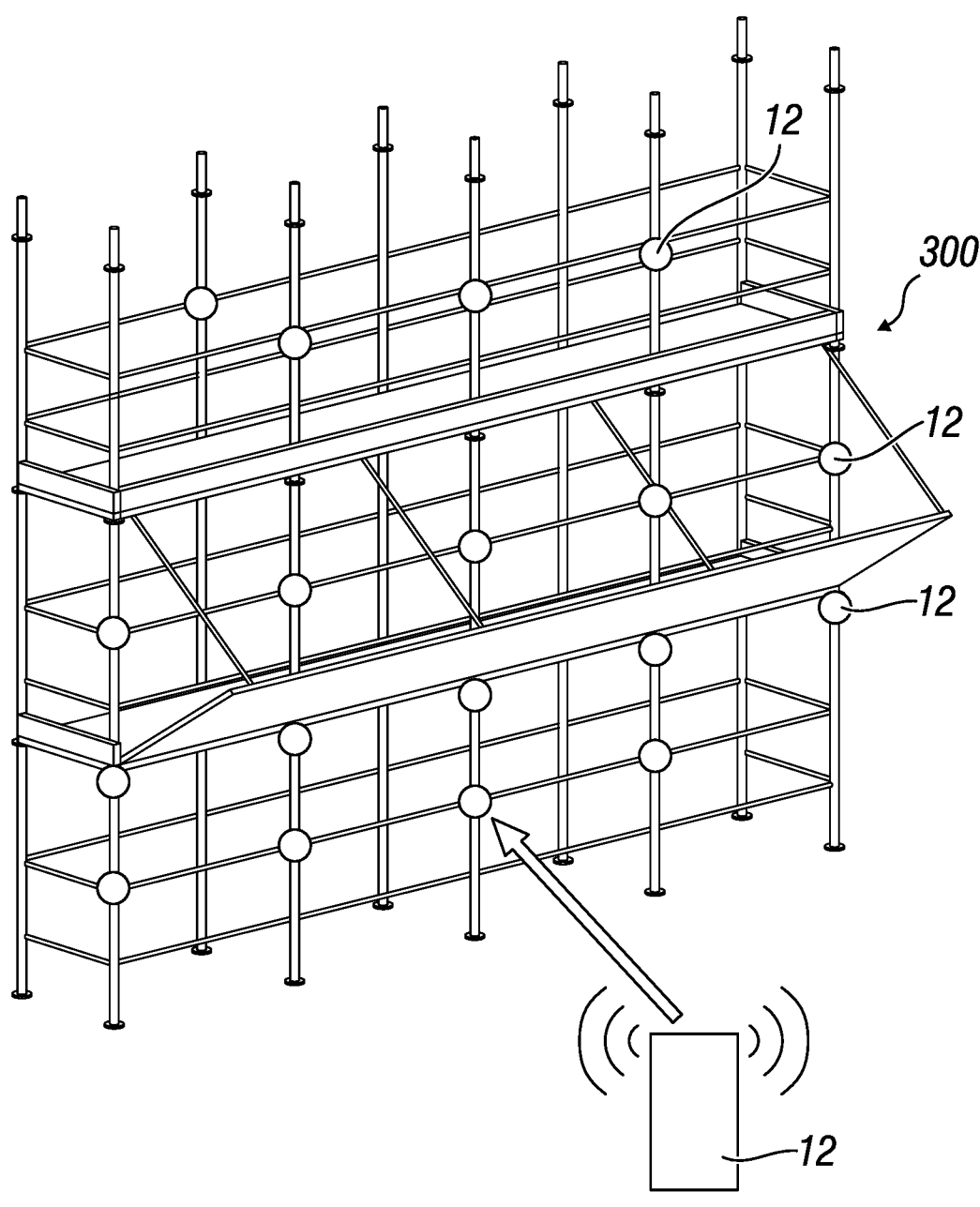
FIGS. 14A and 14B are respective schematic views of two variants of a fourth embodiment of a construction product provided with a respective checking and tracking system capable of implementing the method according to the present invention, wherein the construction product consists in particular of a scaffolding.
Figure 14B:
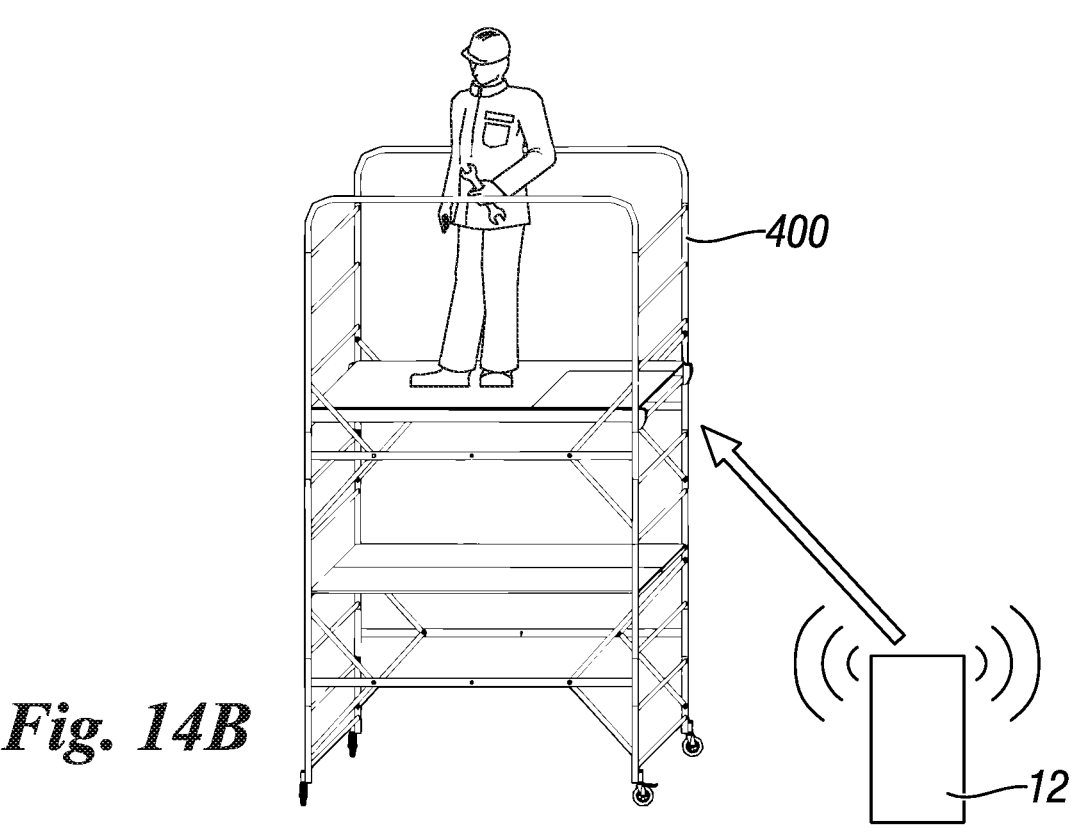

FIGS. 14A and 14B show a construction product consisting in particular of a scaffolding, which can be either a fixed scaffolding 300 (FIG. 14A) or a mobile scaffolding 400 (FIG. 14B). The microchip 12 can be irremovably inserted on the structure (tubulars, platforms, shoe-bars, etc.) of the fixed scaffolding 300 or the mobile scaffolding 400, for example by riveting or by inserting it into a special housing included and irremovably anchored to the structure.

Figure 15:
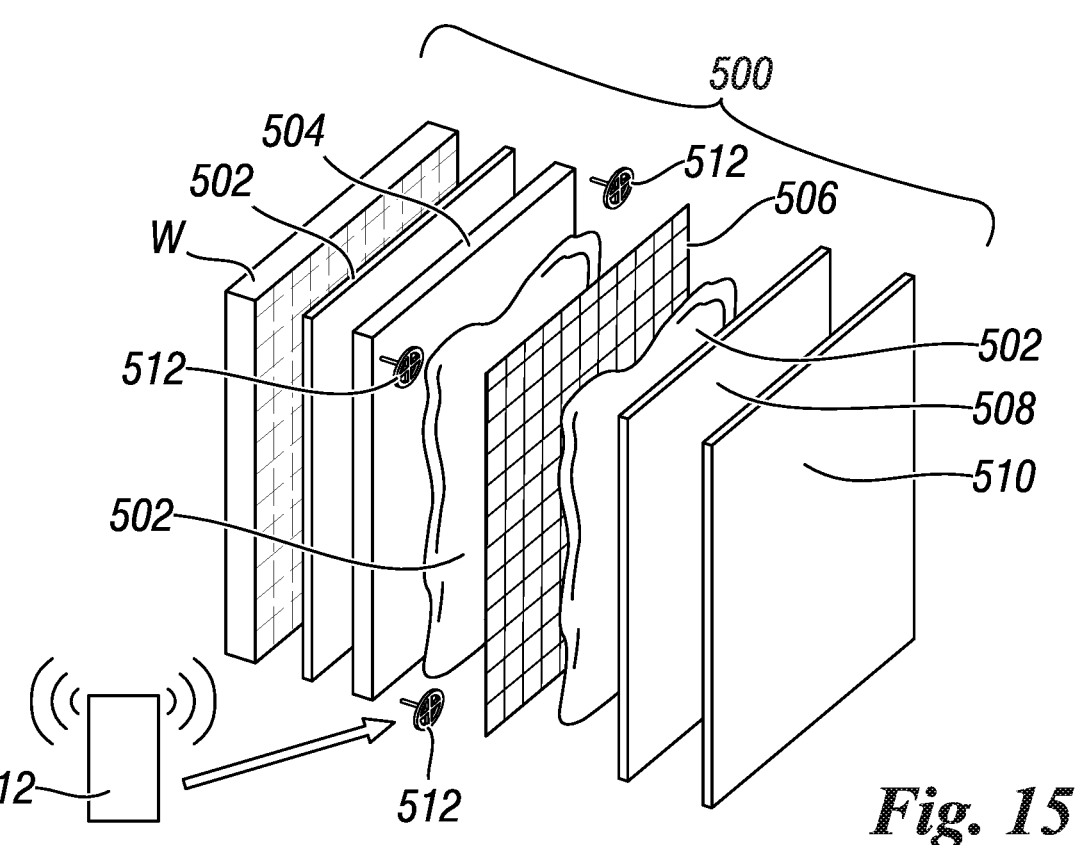
FIG. 15 is a schematic view of a fifth embodiment of a construction product provided with a respective checking and tracking system capable of implementing the method according to the present invention, wherein the construction product consists in particular of a thermal coat complete with all its components (insulating panel, dowels, metal mesh, paint, etc.)

FIG. 15 shows a construction product consisting in particular of a thermal coat 500. The thermal coat 500 is designed for fixing to a wall W and can comprise a plurality of components consisting, for example, of one or more layers of adhesive substances 502, one or more insulating panels 504, one or more meshes 506 of various materials, one or more intermediate 508 and surface 510 coating layers and a plurality of dowels 512. The microchip 12 can be irremovably applied on one or more of these components according to suitable application methods based on technical requirements.

Figure 16:
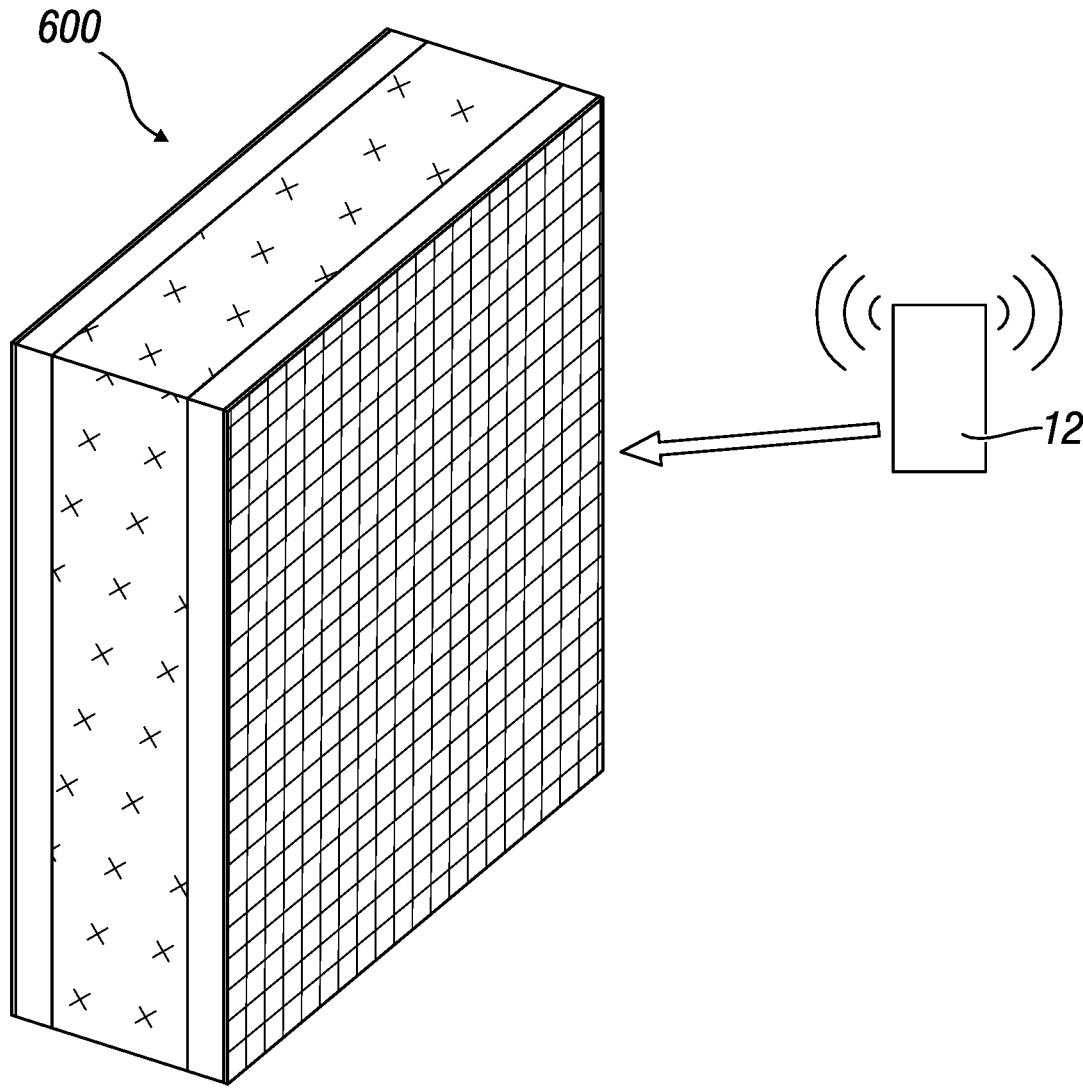
FIG. 16 is a schematic view of a sixth embodiment of a construction product provided with a respective checking and tracking system capable of implementing the method according to the present invention, wherein the construction product consists in particular of a naval application material, such as an insulating and/or soundproofing panel for naval use.

FIG. 16 shows a construction product consisting in particular of an insulating and/or soundproofing panel 600 for naval use. Also in this case the panel 600 can comprise a plurality of components superimposed on each other in a "sandwich" configuration. The microchip 12 can be irremovably applied to one or more of these components according to suitable application methods according to the technical requirements.

Figure 17:
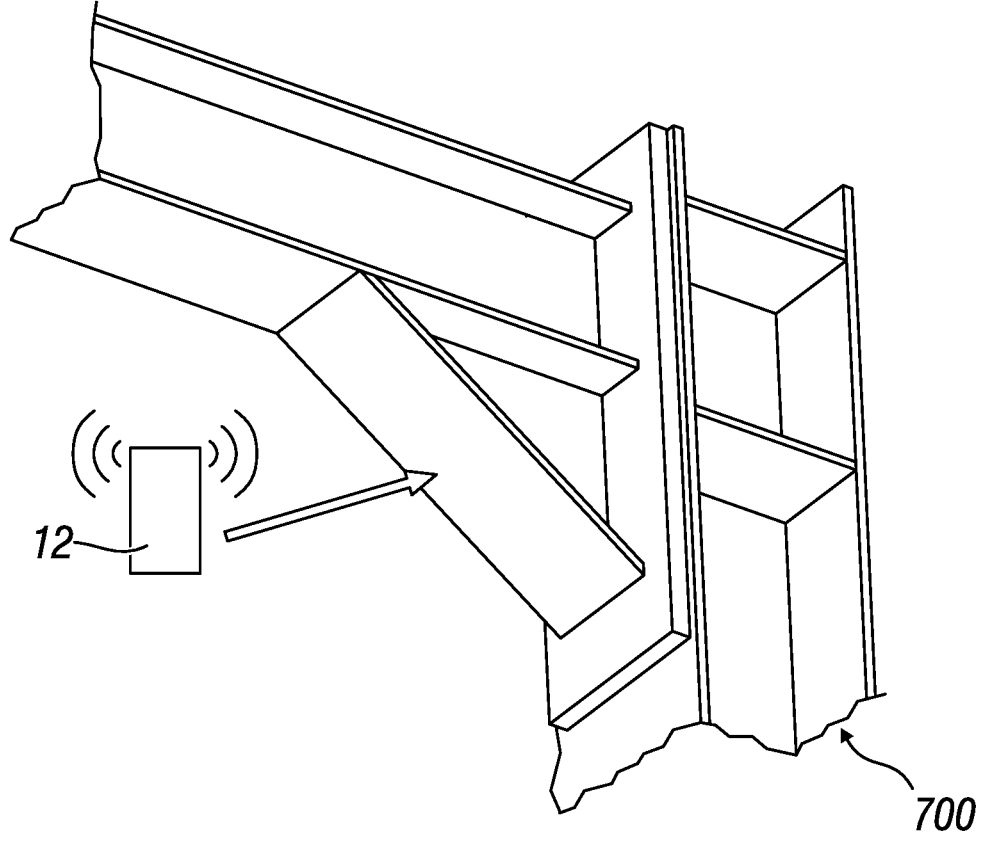
FIG. 17 is a schematic view of a seventh embodiment of a construction product provided with a respective checking and tracking system capable of implementing the method according to the present invention, wherein the construction product consists in particular of an anti-seismic element of metal carpentry.

FIG. 17 shows a construction product consisting in particular of an anti-seismic element of metal carpentry 700. The microchip 12 can be irremovably applied on one or more of these components according to suitable application methods according to the technical requirements.

It has thus been seen that the method for checking and tracking a construction product according to the present invention achieves the purposes highlighted above.

The method for checking and tracing a construction product thus conceived is however susceptible of numerous modifications and variations, all of which falling within the same inventive concept; furthermore, all the details can be replaced by technically equivalent elements. For example, when provided on the respective microchip installation device, the drill tip can operate both in the hot mode and in the cold mode and can be made in different shapes and in different sizes. Furthermore, the checking and tracking system can be carried out both with an "active" type microchip and with a "passive" type microchip in the steps of transport of the construction product and/or on the construction site. Finally, in addition to the aforementioned PCs and smartphones, the remote-control device can be any suitable device already on the market, such as a laser reading gun or a fixed antenna. In practice, the materials used, as well as the shapes and dimensions, may be any according to the technical requirements.

The scope of protection of the invention is therefore defined by the attached claims.

The invention claimed is:

1. A method for checking and tracking a construction product (10; 100; 200; 300; 400; 500; 600; 700) provided with a respective package that at least partially covers or encloses one single construction product (10; 100; 200; 300; 400; 500; 600; 700) or a group comprising two or more similar construction products (10; 100; 200; 300; 400; 500; 600; 700), the method comprising the steps of:

-arranging at least one microchip (12) internally provided with at least one communication device which, through a proprietary wireless communication protocol, is configured to send information to at least one remote-control device (14) and to receive information from said at least one remote-control device (14);

associating predefined information about said construction product (10; 100; 200; 300; 400; 500; 600; 700) to said at least one microchip (12), through said at least one remote-control device (14);

irremovably applying, through at least one installation device (20), said at least one microchip (12) on the surface, or in any other position, of each construction product (10; 100; 200; 300; 400; 500; 600; 700), or on at least part of the construction products (10; 100; 200; 300; 400; 500; 600; 700) enclosed by the same package, or on a single package which covers or at least partially encloses one or more construction products (10; 100; 200; 300; 400; 500; 600; 700);

carrying out the check and tracking of said construction product (10; 100; 200; 300; 400; 500; 600; 700), or at least part of the construction products (10; 100; 200) enclosed by the same package, or of a single package that at least partially covers or encloses one or more construction products (10; 100; 200; 300; 400; 500; 600; 700), through a predefined communication mode between said at least one microchip (12) and said at least remote-control device (14); and carrying out a communication between each remote-control device (14) and at least one management server (48), wherein said management server (48) is configured to communicate with each remote-control device (14) for checking all the predefined information contained on different microchips (12) and concerning a plurality of construction products (10; 100; 200; 300; 400; 500; 600; 700) different from each other, wherein said step of carrying out the check and tracking comprises one or more of the following sub-steps:

management control of the production of said construction product (10; 100; 200; 300; 400; 500; 600; 700);

management control of the shipment of said construction product (10; 100; 200; 300; 400; 500; 600; 700);

management control of the delivery of said construction product (10; 100; 200; 300; 400; 500; 600; 700) to the purchaser;

checking the presence of said construction product (10; 100; 200; 300; 400; 500; 600; 700) during all the construction steps of a specific building;

checking said construction product (10; 100; 200; 300; 400; 500; 600; 700) at the end customer, during and after the installation of said construction product (10; 100; 200; 300; 400; 500; 600; 700).

2. The method according to claim 1, wherein said construction product comprises an insulating panel (10).

3. The method according to claim 2, wherein said insulating panel is manufactured with a material selected from the group consisting of:

cork, wood fibre, rock fibre, sintered expanded polystyrene (EPS) with or without graphite additives, and polyurethane rigid foam (PIR).

4. The method according to claim 1, wherein said construction product is selected from the group consisting of:

a window or door frame (100);

a hydraulic equipment (200);

a scaffolding (300; 400);

a thermal coat (500);

a naval application material (600); and an anti-seismic element of metal carpentry (700).

5. The method according to claim 1, wherein said predefined information is selected from the group consisting of:

the information about the construction product (10; 100; 200; 300; 400; 500; 600; 700) composition;

the construction product (10; 100; 200; 300; 400; 500; 600; 700) order number;

the information about the manufacturer of the construction product (10; 100; 200; 300; 400; 500; 600; 700);

the information about the construction product (10; 100; 200; 300; 400; 500; 600; 700) production batch;

the information about any certifications of the construction product (10; 100; 200; 300; 400; 500; 600; 700);

the information about the construction product (10; 100; 200; 300; 400; 500; 600; 700) transportation modes and its geolocation;

the information about the recipient of the construction product (10; 100; 200; 300; 400; 500; 600; 700);

the information about the installation and any disassembly of the construction product (10; 100; 200; 300; 400; 500; 600; 700);

the information about the disposal methods provided for the construction product 10; 100; 200; 300; 400; 500; 600; 700);

the information necessary to ensure correct and efficient management of the life cycle of the construction product (10; 100; 200; 300; 400; 500; 600; 700); and the information relating to the carbon footprint of the construction product (10; 100; 200; 300; 400; 500; 600; 700).

6. The method according to claim 1, wherein said wireless communication protocol is of the radiofrequency type with LF, HF, UHF and VHF frequencies.

7. The method according to claim 1, wherein each microchip (12) is internally provided with a GPS transceiver, which is configured to receive information on the geographic coordinates of the respective construction product (10; 100; 200; 300; 400; 500; 600; 700) and to transmit said information to said one or more remote-control devices (14), so as to provide for the geo-localization of each construction product (10; 100; 200; 300; 400; 500; 600; 700) or the respective package, provided with the corresponding microchip (12).

8. The method according to claim 1, wherein said remote-control device (14) is of the mobile type and comprises a PC, a tablet or a Smartphone on which a suitable check and tracking software is installed.

9. The method according to claim 1, wherein said remote-control device (14) is of the fixed type and comprises one or more RFID antennas.

* * * * *